(12) United States Patent
Humann

(10) Patent No.: US 6,734,759 B2
(45) Date of Patent: May 11, 2004

(54) DROOP COMPENSATION FILTER HAVING HIGH PASS CHARACTERISTIC

(75) Inventor: Wolfram Humann, Stuttgart (DE)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/237,397

(22) Filed: Sep. 9, 2002

(65) Prior Publication Data

US 2003/0102939 A1 Jun. 5, 2003

(30) Foreign Application Priority Data

Dec. 5, 2001  (EP) .......................... 01128875

(51) Int. Cl.[7] .............. H03H 7/00; H03H 7/01
(52) U.S. Cl. ................. 333/167; 333/175
(58) Field of Search ............... 333/167, 175, 333/28 R, 172, 176, 168; 341/144; 714/743, 724; 375/232

(56) References Cited

U.S. PATENT DOCUMENTS

| | | | |
|---|---|---|---|
| 3,579,154 A | * | 5/1971 | Deen ........................ 333/176 |
| 3,935,551 A | * | 1/1976 | Henniger et al. ........... 333/176 |
| 4,743,873 A | * | 5/1988 | Schultz et al. ............. 333/175 |
| 4,768,205 A | | 8/1988 | Nakayama |
| 5,184,127 A | * | 2/1993 | Myers ........................ 341/122 |
| 5,453,995 A | | 9/1995 | Behrens |
| 5,499,248 A | | 3/1996 | Behrens et al. |
| 5,963,110 A | | 10/1999 | Ihara et al. |
| 6,215,431 B1 | * | 4/2001 | Sheng et al. ................ 341/144 |

FOREIGN PATENT DOCUMENTS

| | | |
|---|---|---|
| EP | 0467412 A2 | 1/1992 |
| EP | 0859318 A1 | 8/1998 |
| EP | 0864977 A1 | 9/1998 |
| EP | 0882991 A1 | 12/1998 |
| EP | 0886214 A1 | 12/1998 |
| EP | 1092983 A1 | 4/2001 |

OTHER PUBLICATIONS

"Coaxial PCM Transmission Using Duobinary Scheme", Sawai et al., NEC Research and Development, 1981, pp. 89–96.

"A New Chip Set For Proposed SMPTE Standard SMPTE 259M—Serial Digital Interface", Webster et al., SMPTE Journal, 1993, vol. 102, No. 9, pp. 777–785.

* cited by examiner

Primary Examiner—Patrick Wamsley
(74) Attorney, Agent, or Firm—Perman & Green, LLP

(57) ABSTRACT

A filter is applied between a digital signal source and a signal receiver for providing compensation of droop caused in a transmission path between the signal source and the signal receiver. The filter provides a high pass characteristic substantially approximating or following in a relevant frequency range an attenuation function substantially proportional to $e^{-k\sqrt{f}}$ or—when denoting attenuation in dB—substantially proportional to the square root of the frequency.

12 Claims, 6 Drawing Sheets

DROOP COMPENSATION FILTER HAVING HIGH PASS CHARACTERISTIC

BACKGROUND OF THE INVENTION

The present invention relates to compensation of droop caused in a transmission path.

Integrated Circuits (IC) generally need to be tested to assure proper operation. This—in particular—is required during IC development and manufacturing. In the latter case, the ICs are usually tested before final application. During test, the IC, as device under test (DUT), is exposed to various types of stimulus signals, and its responses are measured, processed and usually compared to an expected response of a good device. Automated test equipments (ATE) usually perform these tasks according to a device-specific test program. Examples for ATE are the Agilent 83000 and 93000 families of Semiconductor Test Systems of Agilent Technologies. Details of those families are also disclosed e.g. in EP-A-859318, EP-A-864977, EP-A-886214, EP-A-882991, EP-A-1092983, U.S. Pat. Nos. 5,499,248, 5,453,995.

Signals generally experience some degradation due to more or less lossy transmission paths, usually referred to as 'Droop Effect'. In particular when reaching higher frequencies beyond several hundred MHz, such signal degradation becomes more and more important and has to be considered in design and applications.

In digital test and measurement applications, e.g. ATE applications, it has to be made sure that the rise time at the output of a transmission path stimulated by a voltage step at the input is sufficiently lower than the rise time of pulses to be measured. Otherwise, pulse rise times cannot be measured accurately.

SUMMARY OF THE INVENTION

It is an object of the invention to improve higher frequency measurement applications. The object is solved by the independent claims. Preferred embodiments are shown by the dependent claims.

According to the present invention, a filter is applied between a digital signal source and a signal receiver for providing compensation for droop caused in a transmission path between the signal source and the signal receiver.

The filter is designed to provide a high pass characteristics substantially approximating or following in a relevant frequency range an attenuation function substantially proportional to $e^{-k\sqrt{f}}$ or—when denoting attenuation in dB—substantially proportional to the square root of the frequency. Thus, droop effects dominated by skin effect in the relevant frequency range can be efficiently compensated.

In a preferred embodiment, the filter comprises a plurality of different filter stages each substantially following an attenuation characteristic characterized by asymptotic behaviors for higher and for lower frequencies and a transition behavior between the two asymptotic behaviors. The difference between the attenuation values of the asymptotes for higher and for lower (e.g. DC-attenuation) frequencies represents a measure for the attenuation of each stage and shall be referred to as the 'stage attenuation'. It is clear, however, that this stage attenuation need not necessarily represent the maximum possible attenuation of the stage. In particular overswing behaviors, e.g. towards the asymptotes, might cause higher attenuation values than the stage attenuation.

A center frequency can be assigned to each transition behavior representing a frequency in the center of the transition behavior. The center frequency can be determined e.g. by a reversal or turning point in the transition, a mean frequency of the transition behavior range, or as the point in frequency where the stage has half of its stage attenuation. However, it is to be understood that the center frequency only represents a tool for characterizing the attenuation behavior over frequency of each stage, but is not to be interpreted in a sense e.g. of providing precisely the 'center' of the transition behavior range.

The plurality of filter stages is preferably designed such that the transition behaviors are distributed over the relevant frequency range. Preferably, the center frequencies of the stages are distributed over the relevant frequency range. In one embodiment, the relevant frequency range is divided into a plurality of sub-ranges and each sub-range will be dominated by the transition behavior of one stage. It is clear that a certain overlapping of the transition behaviors of different stages might occur, in particular dependent on the number and width of the sub-ranges. A higher overlapping will generally occur with increasing number of stages/sub-ranges.

The plurality of filter stages is further preferably designed such that the stage attenuation increases with increasing center frequency.

The attenuation characteristics of the different filter stages superimpose to the attenuation characteristics of the (entire) filter.

While it is clear that approximation of the square root behavior can be improved with increasing number of stages, it has to be considered that also parasitic effects generally increase with increasing number of stages. In a preferred embodiment, 3 stages are provided already allowing to sufficiently approximating the square root behavior.

In a preferred embodiment, the filter comprises a plurality of stages each having the same schematics or arrangement of components but with different component values. Thus, the characteristics off all stages are the same in principle, and the individual characteristic can be adjusted by selecting the component values. This significantly fosters designing of the filter. Preferably, the stages are arranged in series, however parallel or even mixed arrangements can also be applied.

Preferably, each stage comprises two resistors (preferably with substantially same resistance value) in series, with a third resistor being coupled between the two. A capacitor is coupled parallel to the two resistors, and an inductor is connected in series with the third resistor (preferably between the third resistor and ground). This T- or star-arrangement of resistors represents a standard attenuator circuit known in the art. Such attenuator circuit, when designed for an environment of characteristic impedance Z and terminated at its output with impedance Z, will attenuate signals from its input to output by a defined, frequency-independent amount and will not reflect any portion of the signal present at its input. Other equivalent topologies for the attenuator are commonly referred to as "Pi" and "Bridged T".

Preferably, the capacitor and inductor values are chosen (matched?) such that $L=Z^2 C$. This will ensure that the capacitor and the inductor contribute to the transition behavior of the stage at the same frequency and that, over the entire frequency range, the whole stage will not reflect any portion of the signal present at its input.

The values of the resistors determine the DC-attenuation (i.e. the asymptote for lower frequencies), while the matched values of capacitor and inductor determine the transition and thus the center frequency of each stage. Such stages are preferably arranged in series.

In another preferred embodiment, the stages of the filter are designed in a combined arrangement. Preferably, the filter comprises two resistors (preferably with substantially same resistance value) in series with a third resistor coupled between the two. An inductor is connected in series with the third resistor thus representing a first stage. A first capacitor in series with a resistor is coupled in parallel to the two resistors thus representing a second stage. A second capacitor with or without a resistor in series is further coupled in parallel to the two resistors thus representing a third stage. This T- or star-arrangement of resistors represents the same standard attenuator circuit as explained above. The values of the resistors each determine the DC-attenuation (i.e. the asymptote for lower frequencies), while the values of the capacitors and the inductor each determine the transition and thus the center frequency of each stage. Contrary to the above-illustrated embodiment, it is therefore not possible to match each capacitor to an inductor (and vice versa) such that reflections are minimized.

In one embodiment, the principle characteristic of the filter can be designed in two different ways: Firstly, since the filter will result in an attenuation of the signal to be compensated, the filter attenuation will be determined by the maximum acceptable attenuation for the signals. Since the filter substantially approximates a square root behavior of the attenuation over the frequency, this maximum acceptable attenuation for the signals translates into a maximum applicable frequency of the filter. Secondly and opposite to the first way, a given maximum applicable frequency of the filter will translate accordingly to a maximum attenuation of the filter. In case the filter attenuation exceeds the maximum acceptable attenuation for the signals, signal amplification stages might be provided.

The invention can be partly or entirely supported by one or more suitable software programs, which can be stored on or otherwise provided by any kind of data carrier, and which might be executed in or by any suitable data processing unit. Software programs or routines are preferably applied for designing the filter and its stages.

The inventive filter is preferably applied in an ATE as signal recovery before receiving the response signals to be measured and processed (e.g. by comparing to an expected response of a good device). Thus signal rise times degraded by the transmission path between the DUT and the receiving unit of the ATE can be efficiently recovered allowing to measure the DUT with significantly improved accuracy.

BRIEF DESCRIPTION OF THE DRAWINGS

Other objects and many of the attendant advantages of the present invention will be readily appreciated and become better understood by reference to the following detailed description when considering in connection with the accompanied drawings. Features that are substantially or functionally equal or similar will be referred to with the same reference sign(s).

DETAILED DESCRIPTION OF THE INVENTION

Figure 1:
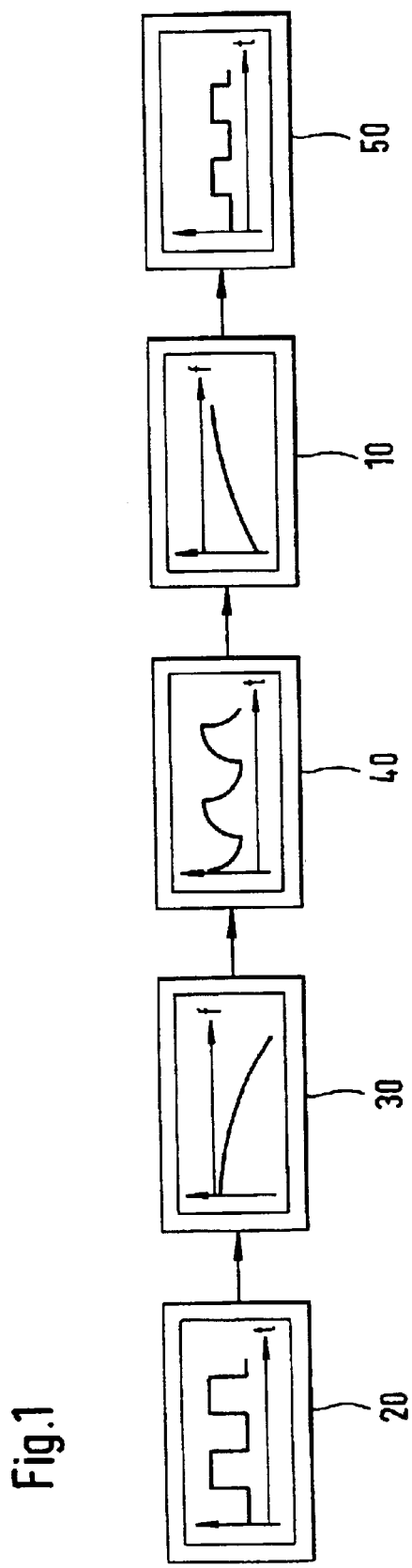
FIG. 1 illustrates the principle application of a filter 10 according to the present invention.

In FIG. 1, a signal response 20 of a DUT in an ATE (as introduced in the introductory part of the description) is degraded in a transmission path 30 resulting in a degraded signal response 40. The filter 10 provides signal compensation to the degraded signal response 40 resulting in a compensated signal response 50 eventually received by the ATE and further processed.

Due to the attenuation of both the transmission path 30 and the filter 10, it is clear that the resulting signal level of the compensated signal response 50 can be significantly decreased with respect to the signal level of the signal response 20. Signal amplification might be required.

In the preferred ATE application of the filter 10, the clock rate for the provision of the DUT stimulus signals is in the range of 200 MHz to 2 GHz.

Figure 2A:
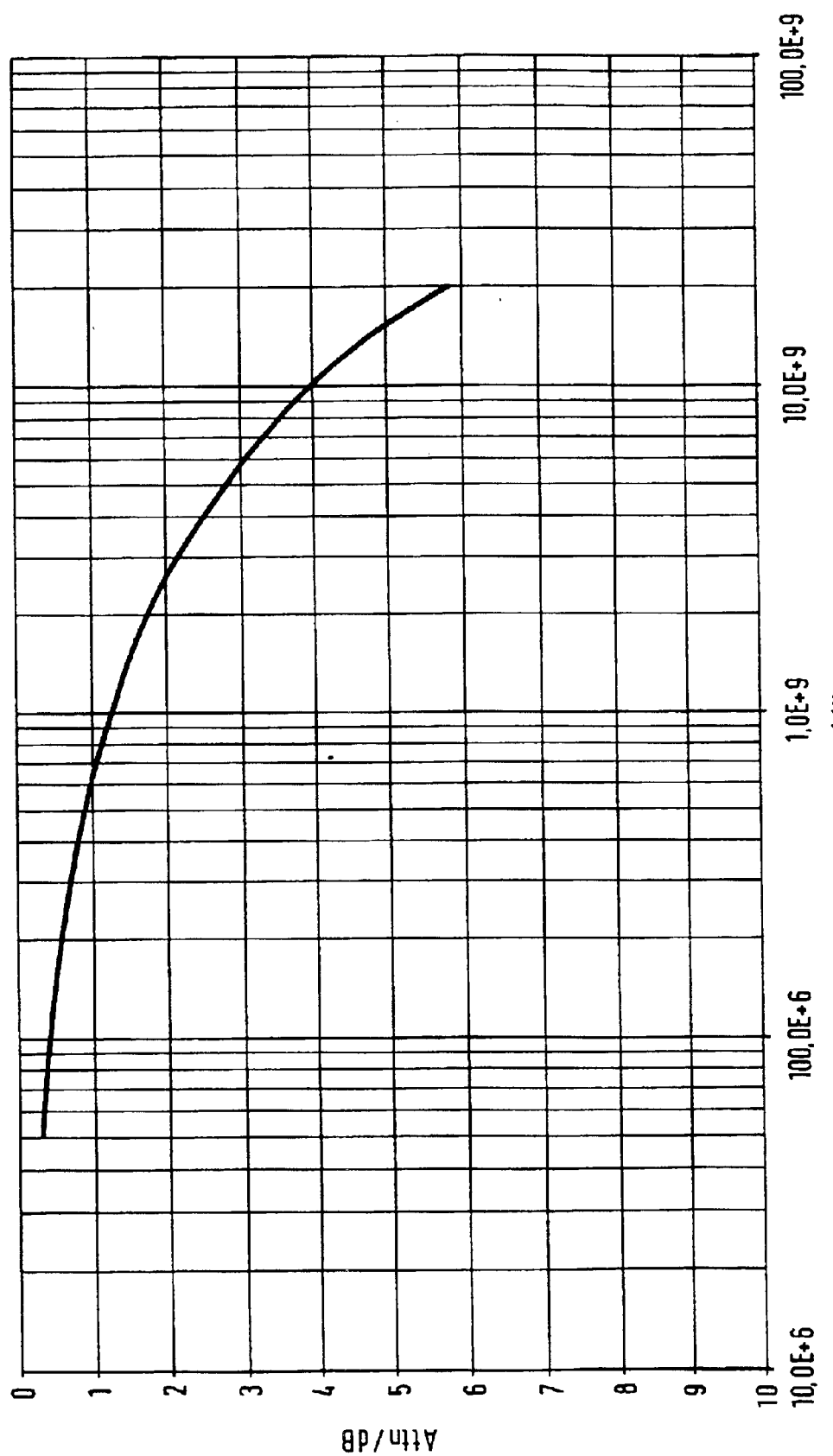
FIG. 2 show simulated attenuation characteristics of a model transmission path 30 and of a 'ideal' high pass characteristic of the filter 10.
Figure 2B:
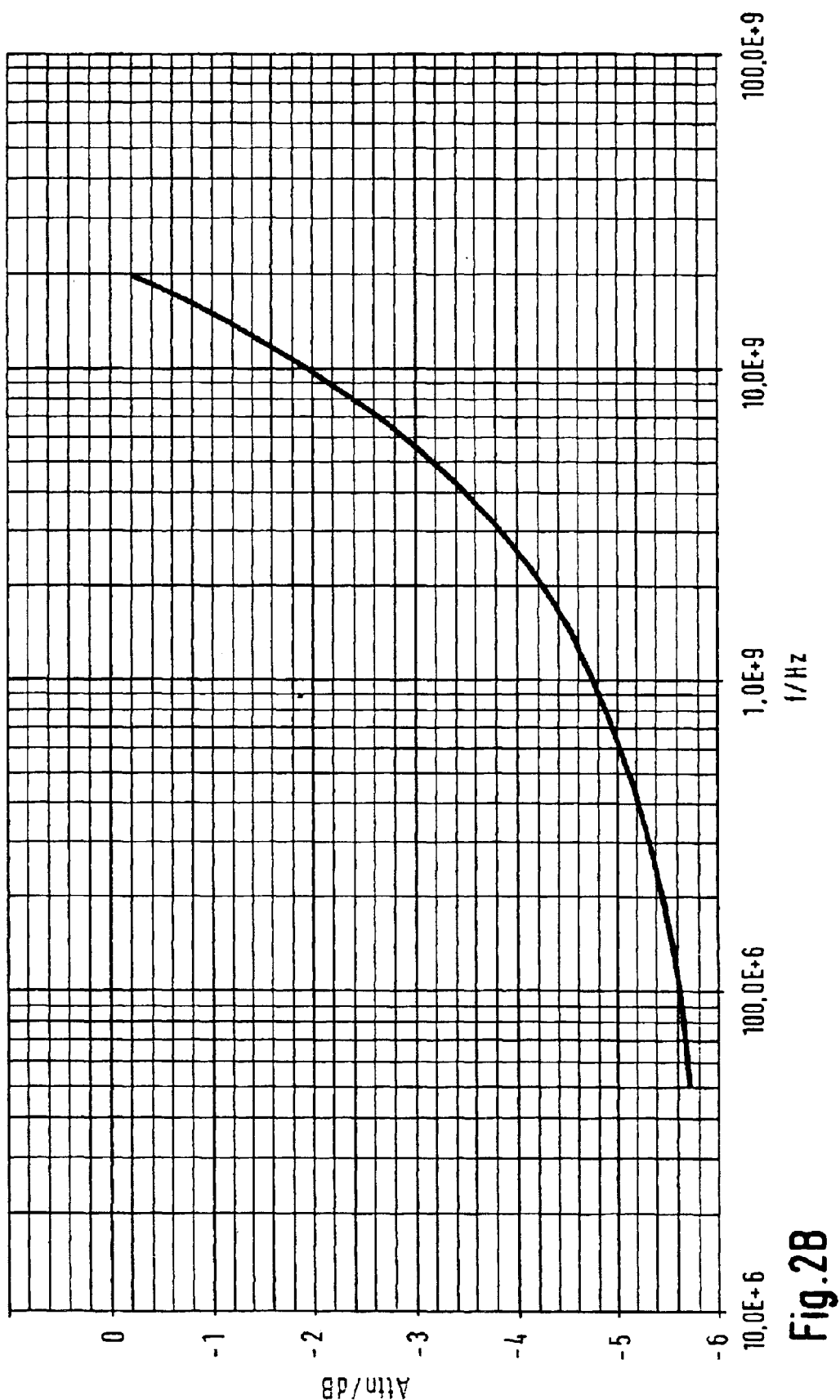

FIG. 2A shows a simulated attenuation characteristic based on a model of the transmission path 30 dominated by skin effect for frequencies in the range of 1 MHz and 100 GHz, and more preferably between 50 MHz to 20 GHz. Following the applied model here, the simulated attenuation characteristic is proportional to the square root of the frequency. Accordingly for fully compensating all signal degradation caused by the transmission path 30, the filter 10 has to be designed to provide a high pass characteristic inversely approximating or following the attenuation function of FIG. 2A. Such 'ideal' high pass characteristic of the filter 10 substantially proportional to the square root of the frequency is illustrated in FIG. 2B.

FIGS. 3 illustrates a first example for designing the filter 10. FIG. 3A shows the circuit of the filter 10 with three filter stages 300A, 300B, and 300C. Each stage 300 comprises two resistors (with same resistance values) in series with a third resistor coupled between the two. A capacitor is coupled parallel to the two resistors, and an inductor is connected in series with the third resistor. This T-arrangement of resistors avoids reflections. The values of the resistors determine the DC-attenuation of each stage, while the values of capacitor and inductor together determine the transition and thus the center frequency of each stage. Such stages are preferably arranges in series.

Figure 3A:
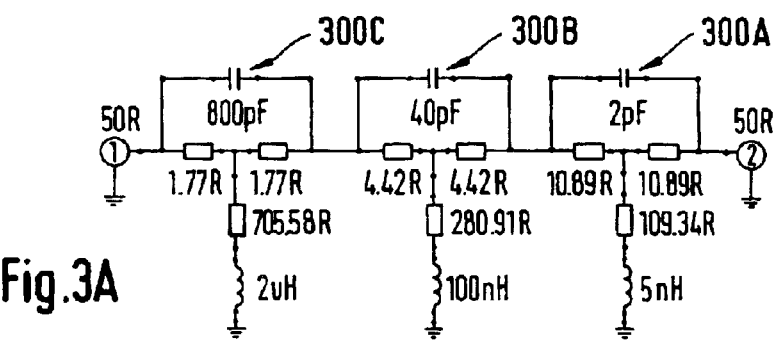
FIGS. 3 and 4 illustrate examples for designing the filter 10.
Figure 3B:
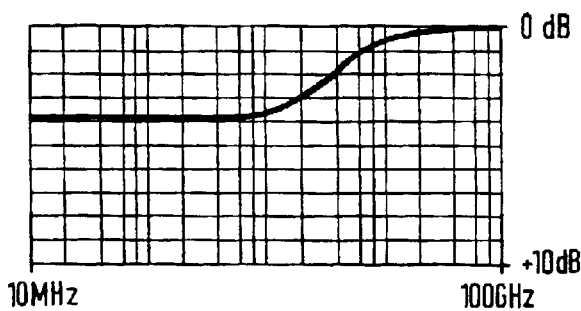
Figure 3C:
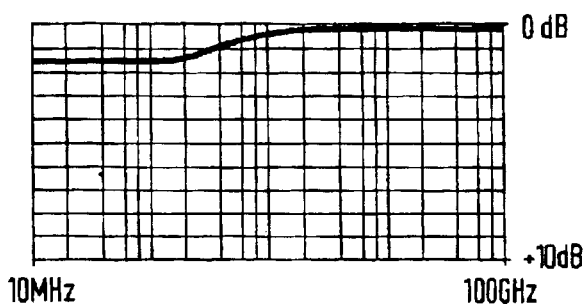
Figure 3D:
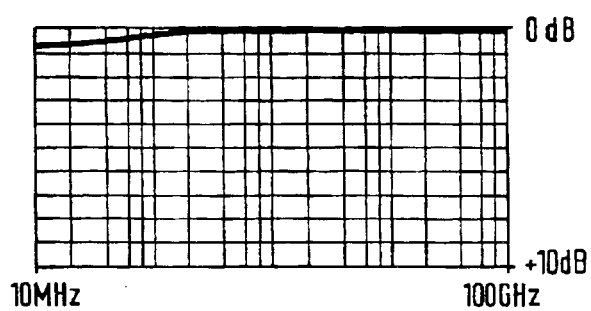
Figure 3E:
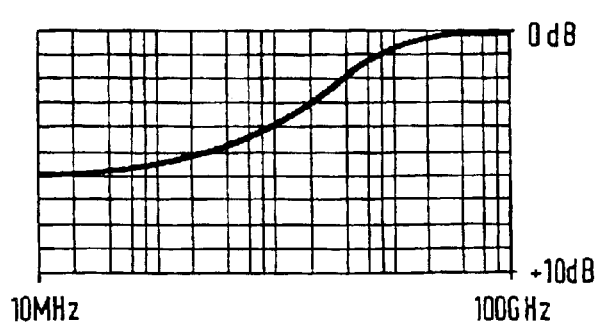

FIGS. 3B–3D illustrate the attenuation characteristic of each stage 300, and FIG. 3E shows the attenuation characteristic of the entire filter 10 as the superimposed characteristics of all three stage 300A, 300B, and 300C. In all FIGS. 3B–3E, the x-axis goes from 10 MHz to 100 GHz, while the y-axis goes from 0 dB to +10 dB attenuation. FIG. 3B corresponds to stage 300A, FIG. 3C corresponds to stage 300B, and FIG. 3D corresponds to stage 300C.

Stage 300A (with the two resistors of 10.89Ω, the third resistor of 109.34Ω, the capacitor of 2 pF, and the inductor of 5 nH) shows an asymptote for lower frequencies (usually referred to as DC-attenuation) of 3.85 dB, an asymptote for higher frequencies of 0 dB, a transition therebetween from about 1 GHz to 10 GHz, and a center frequency (where the stage has about half of its maximum attenuation) of about 3.6 GHz.

Stage 300B (with the two resistors of 4.42Ω, the third resistor of 280.91Ω, the capacitor of 20 pF, and the inductor of 100 nH) shows an asymptote for lower frequencies of 1.54 dB, an asymptote for higher frequencies of 0 dB, a transition therebetween from about 100 MHz to 1 GHz, and a center frequency of about 450 MHz. Stage 300C (with the two resistors of 1.77Ω, the third resistor of 705.58Ω, the capacitor of 800 pF, and the inductor of 2 µH) shows an asymptote for lower frequencies of 0.61 dB, an asymptote for higher frequencies of 0 dB, a transition therebetween from about 20 MHz to 200 MHz, and a center frequency of about 57 MHz.

The superimposition of all three stages 300A, 300B, and 300C in FIG. 3E shows an asymptote for lower frequencies of 3.85+1.54+0.61=6.00 dB, an asymptote for higher frequencies of 0 dB. The superimposition already comes close to the 'ideal' high pass characteristic of FIG. 2B being substantially proportional to the square root of the frequency.

Each of the three stages 300A, 300B, and 300C shows, over the entire frequency range, substantially no reflection with infinitely accurate component values and less than −80 dB for the values given in FIG. 3A. The same applies for the superimposition of all three stages in FIG. 3E.

FIGS. 4 illustrate a second preferred example of a design for the filter 10. FIG. 4A shows the circuit of the filter 10 with three filter stages 400A, 400B, and 400C. Comparing the circuit of FIGS. 4A and 3A immediately makes clear that the term 'stage' is not limited to a serial design as in FIG. 3A, but also covers combined serial and parallel connections of functional stage units.

The filter 10—again—comprises two resistors (here: each 16.6Ω) in series with a third resistor (here: 67Ω) coupled between the two. An inductor (here: 3.3 nH) is connected in series with the third resistor thus representing the first stage 400A. A first capacitor (here: 5.6 pF) is coupled in parallel to the two resistors thus representing the second stage 400B. A second capacitor (here: 12 pF) with a resistor (here: 80Ω) in series is further coupled in parallel to the two resistors thus representing the third stage 400C. This T-arrangement of resistors also avoids reflections.

Figure 4A:
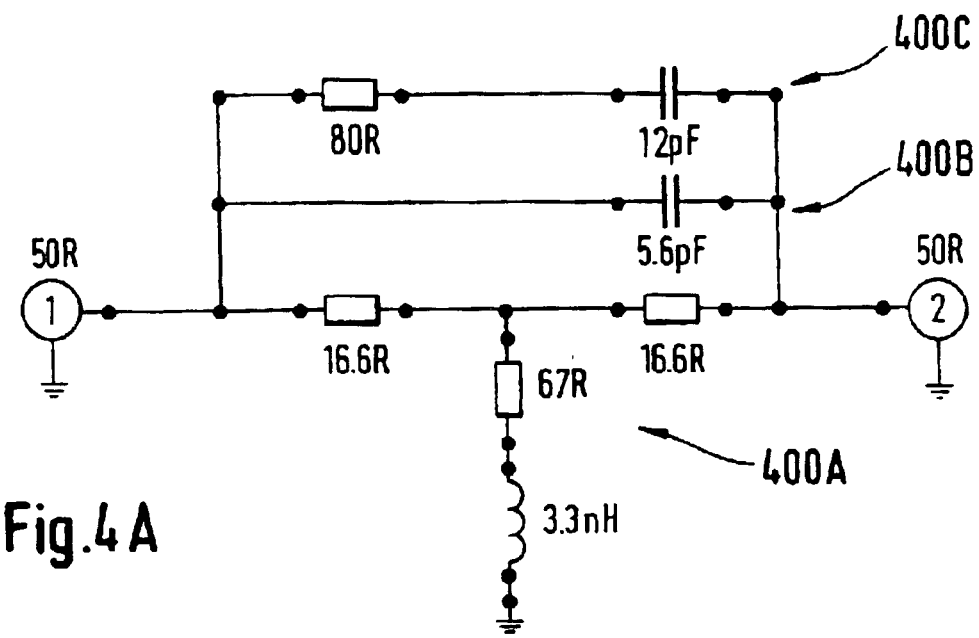
Figure 4B:
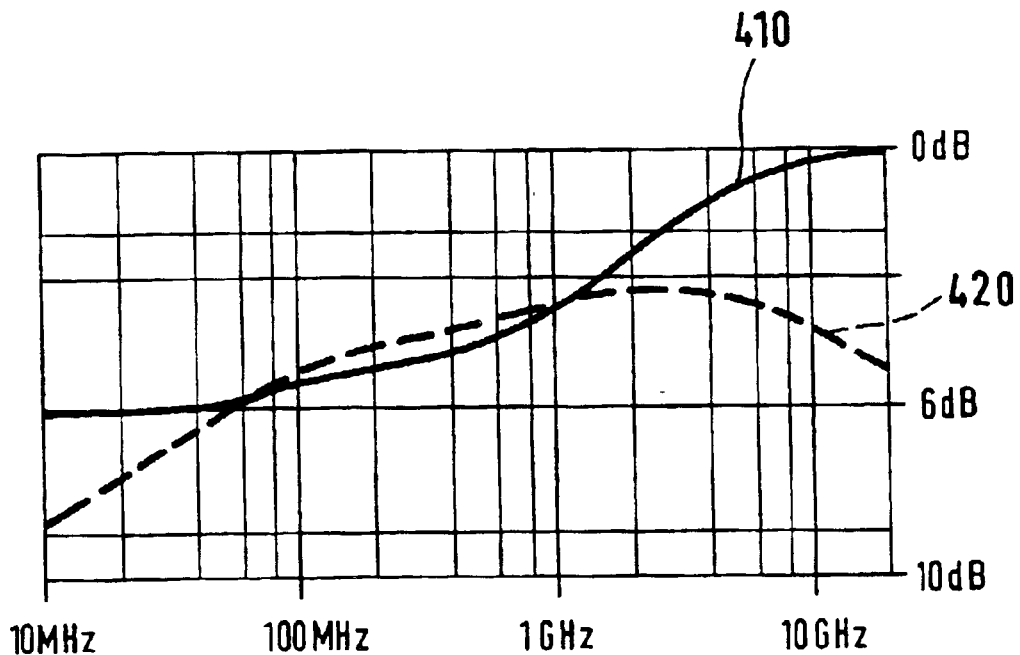

FIG. 4B shows a simulation of the filter 10 according to FIG. 4A with the attenuation characteristic 410 and the reflection characteristic 420. The filter shows an asymptote for lower frequencies of about 6 dB and an asymptote for higher frequencies of 0 dB. The superimposition—again—comes close to the 'ideal' high pass characteristic of FIG. 2B.

Each of the capacitors and the inductor in FIG. 4A are determined by the desired center frequency of their corresponding stage. It is therefore not possible to match each capacitor to an inductor (and vice versa) such that reflections are minimized. The maximum of the reflection characteristic 420 in the example of FIG. 4B is thus at just −16 dB.

Figure 4C:
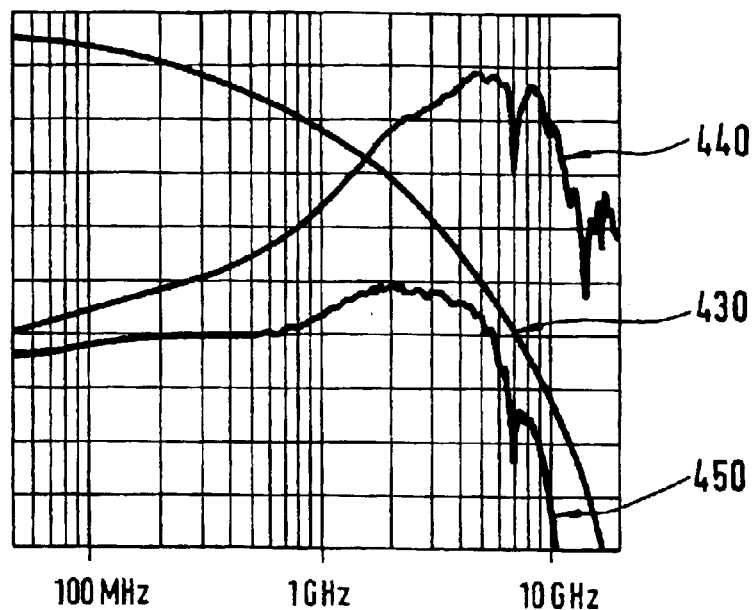

FIG. 4C shows actual spectral measurements. Reference sign 430 depicts the attenuation characteristic of the transmission path 30 showing the droop effect for higher frequencies. Reference sign 440 depicts the attenuation characteristic of the filter 10 according to FIG. 4A, and reference sign 450 shows the combined attenuation characteristic of both the transmission path 30 and the filter 10 according to FIG. 4A. In contrast to attenuation characteristic 430 of the transmission path 30, the combined attenuation characteristic 450 shows an 'almost flat' attenuation characteristic until about 5 GHz. However, due to the attenuation of both the transmission path 30 and the filter 10, the resulting signal level of the compensated signal response 50 will be significantly decreased.

Figure 4D:
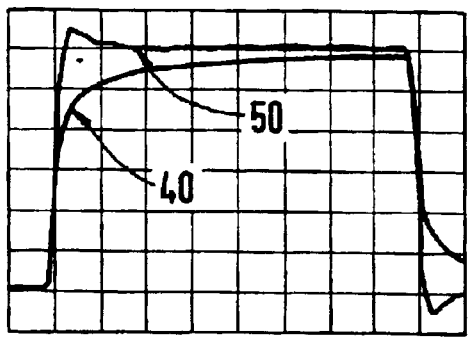
Figure 4E:
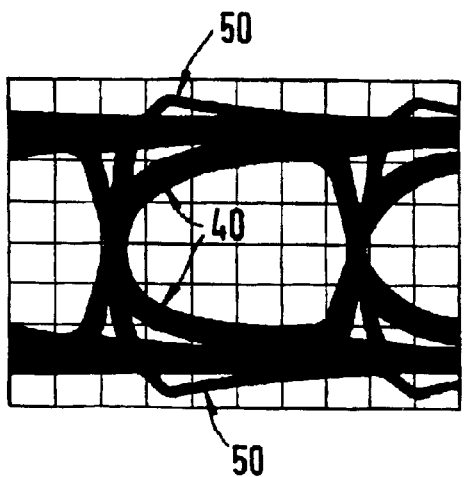

FIGS. 4D and 4E illustrate the effect of the filter 10. While both FIGS. 4D and 4E depict actual measurements using the embodiment of FIG. 4A for the filter 10, similar results could be shown e.g. for the filter 10 according to FIG. 3A. FIG. 4D shows the measured response signal 40' (without filter 10) for a 625 Mbit/s clock signal, and the compensated response signal 50 as the signal 40 after being applied to the filter 10 and after being level-compensated.

FIG. 4E illustrates the effect of the filter 10 in a so-called eye-diagram for a 3.6 Gbit/s PRBS-signal as signal 20 (refer to FIG. 1). While the eye-diagram for the compensated response signal 50 is almost open—indicating a significantly improved Bit-Error-Rate behavior, much shorter rise-times and fall-times, more clearly defined high and low levels and a significantly reduced amount of data-dependent jitter—the eye-diagram for the measured response signal 40 (without filter 10) is significantly closed causing higher Bit-Error-Rates values.

What is claimed is:

1. A filter adapted to be applied between a digital signal source and a signal receiver for providing compensation for droop caused in a transmission path between the signal source and the signal receiver, the filter comprising a high pass characteristic substantially approximating or following in a relevant frequency range an attenuation function substantially proportional to $e^{-k\sqrt{f}}$ or—when denoting attenuation in dB—substantially proportional to the square root of the frequency, wherein the filter further comprises a plurality of different filter stages each substantially following an attenuation characteristic characterized by asymptotic behaviors for higher and for lower frequencies and a transition behavior between the two asymptotic behaviors, the attenuation characteristics of the different filter stages superimposing to the attenuation characteristics of the filter.

2. The filter of claim 1, wherein the filter comprises a plurality of stages each having the same arrangement of components or schematics but with different component values.

3. The filter of claim 2, wherein each stage comprises two resistors in series with a third resistor coupled between the two, a capacitor being coupled parallel to the two resistors, and an inductor being connected in series with the third resistor, preferably between the third resistor and ground.

4. The filter of claim 1, wherein the plurality of filter stages is preferably designed such that the transition behaviors are distributed over the relevant frequency range.

5. The filter of claim 1, wherein the center frequencies of the stages are distributed over the relevant frequency range.

6. The filter of claim 1, wherein the relevant frequency range is divided into a plurality of sub-ranges and each sub-range will be dominated by the transition behavior of one stage.

7. The filter of claim 1, wherein the plurality of filter stages is designed such that the stage attenuation increases with increasing center frequency.

8. The filter of claim 1, wherein the filter comprises three filter stages.

9. The filter of claim 1, wherein the relevant frequency range is in the range of 1 MHz to 100 GHz, and preferably in the range of 50 MHz to 20 GHz.

10. A measuring device adapted to receive a response signal, the response signal being degraded by a transmission path, comprising a filter of claim 1 for compensating the degraded response signal.

11. An automated test equipment adapted for providing a stimulus signal to a device under test—DU—and to receive a response signal representing the response of the DUT on the stimulus signal, wherein the response signal being degraded by a transmission path, the automated test equipment comprising a filter of claim 1 for compensating the degraded response signal.

12. A filter adapted to be applied between a digital signal source and a signal receiver for providing compensation for droop caused in a transmission path between the signal source and the signal receiver, the filter comprising a high pass characteristic substantially approximating or following in a relevant frequency range an attenuation function substantially proportional to $e^{-k\sqrt{f}}$ or—when denoting attenuation in dB—substantially proportional to the square root of the frequency, the filter further comprising two resistors in series, a third resistor coupled between the two resistors, an inductor being connected in series with the third resistor, a first capacitor in series with a resistor being coupled in parallel to the two resistors, and a second capacitor with or without a resistor in series being coupled in parallel to the two resistors.

* * * * *